United States Patent Office 3,259,630
Patented July 5, 1966

3,259,630
PROCESS FOR THE MANUFACTURE OF LINEAR QUINACRIDONES
Henri Streiff, Birsfelden, Switzerland, assignor to Ciba Limited, Basel, Switzerland, a Swiss company
No Drawing. Filed Sept. 18, 1963, Ser. No. 309,860
Claims priority, application Switzerland, Oct. 3, 1962, 11,600/62
4 Claims. (Cl. 260—279)

The present invention is an improvement in or modification of my application Serial No. 113,956, filed on May 31, 1961, which describes a process for the manufacture of linear quinacridones by ring-closure of 2:5-di-(arylamino)-terephthalic acids with acrylcarboxylic acid halides in the presence of an inert diluent. By the said process the quinacridones are obtained in very good yields but, disadvantageously, in the form of very fine crystals. This makes filtering of the solvent difficult so that large batches may need relatively long filtering times.

The present invention is based on the observation that coarsely granular pigments that are easy to filter are obtained by ring-closure of a 2:5-di-(phenylamino)-terephthalic acid with an acrylcarboxylic acid halide in high boiling solvent as described in the parent specification in the presence of a pyridine base.

A pyridine bases to be used in the present process there may be mentioned above all pyridine itself and its nearest homologues, for example methylpyridines such as $\alpha$-picoline or mixtures of methylpyridines such as the commercial mixture of $\beta$- and $\gamma$-picoline.

The ratio of pyridine base to diphenylaminoterephthalic acid may vary within wide limits. Even a relatively small proportion of pyridine, for example 0.3 mol per mol of diphenylaminoterephthalic acid, will effect easy filtration of the end product. A particularly good effect is achieved by using 0.5 to 2.5 mols of pyridine base per mol of diphenylaminoterephththalic acid. When less than 2 mols of pyridine per mol of diphenylaminoterephthalic acid are used, the resulting quinacridone displays a modification which is similar to that of the $\alpha$-form and which is relatively easy to transform into the known $\alpha$-form or the $\gamma$-form, as desired. Surprisingly, the quinacridone is obtained in the $\beta$-form when the ring-closure is carried out with more than 2 mols of pyridine base per mol of diphenylaminoterephthalic acid. It is uneconomical to use substantially more than 2 mols, for example 3 mols, of pyridine base since this would not improve the filtering properties of the quinacridone obtained.

As arylcarboxylic acid chlorides there may be used those mentioned in the parent specification, especially benzoyl chloride. Suitable high-boiling organic solvents are likewise those proposed in the parent specification, especially nitrobenzene.

Since the quinacridones manufactured according to the present process are easy to filter the diluent can be readily removed even when large batches are concerned. In order to remove any soluble impurities present it is of advantage to wash the filter cake first with a further amount of the high-boiling diluent used and then to wash it with a diluent having a lower boiling point, for example an aliphatic alcohol such as methanol. To remove any last traces of the high-boiling solvent it is advantageous to suspend the filter cake in water and steam distil, whereupon an aqueous dispersion of the dyestuff is obtained that is easy to filter. For certain applications it may be advantageous to reprecipitate the quinacridone obtained in this manner from concentrated sulfuric acid.

When the quinacridones obtained by the present process are finely dispersed by any one of the known methods and then incorporated with organic products of high molecular weight, they produce very pure colourings that are fast to light and migration.

Unless otherwise indicated, parts and percentages in the following examples are by weight.

Example 1

139.2 parts of 2:5-dianilinoterephthalic acid were stirred in 500 parts by volume of nitrobenzene and 60 parts by volume of pyridine. 100 parts by volume of benzoyl chloride were then added dropwise in the course of half an hour, during which the temperature rose to about 45° C. and a clear, deep yellow solution was formed which was heated for 2 hours at 140 to 150° C. and then for another 12 hours at 200 to 210° C. The batch was allowed to cool to 120° C. and the thin, dark orange suspension was suction-filtered and washed with 800 parts by volume of nitrobenzene (heated to about 100° C.) and then with 500 parts by volume of cold methanol. The orange red, coarsely granular filter cake was suspended in 500 parts of water, 50 parts by volume of 30% sodium hydroxide solution were added, and the whole distilled with steam until the adhering methanol and traces of nitrobenzene were completely removed. The distillation residue was suction-filtered, washed with hot water until free from alkali and then dried under vacuum. Yield: 112.7 parts (=90.2% of the theoretical) of pure quinacridone.

When pyridine was replaced by an equimolecular amount of $\alpha$-picoline or by a commercial mixture of isomeric $\beta$- and $\gamma$-picoline, a similar result was obtained.

To identify the modification of the quinacridone obtained an X-ray diffraction pattern was made by a conventional powder method with a bent-crystal camera focused according to the Guinier principle. The interplanar spacings could be calculated in the usual manner from the reflection angles. The values of the interplanar spacings were accurate to within 2% (variation was less and in general than 1%). The relative intensities of the reflections were recorded from the films with a double beam micro-photodensitometer.

For comparison an X-ray diffraction pattern was also made from $\alpha$-modification of quinacridone obtained as described for the first time by Liebermann [see Liebig's Annalen 518, page 251 (1935)] by keeping a solution of quinacridone in concentrated sulfuric acid over water.

| X-ray diffraction pattern of the new modification prepared as described in this Example | | X-ray diffraction pattern of the known $\alpha$-modification | |
|---|---|---|---|
| Inter-planar spacings, A. | Line intensity | Inter-planar spacings, A. | Line intensity |
| 14.3 | Strong. | 14.4 | Strong. |
| 7.14 | Weak. | 7.12 | Medium. |
| 6.37 | Strong. | 6.28 | Medium to strong. |
| 6.15 | Week. | | |
| 5.54 | Do. | 5.31 | Weak. |
| | | 4.26 | Do. |
| 3.72 | Do. | 3.70 | Do. |
| 3.54 | Medium. | 3.56 | Do. |
| 3.44 | Medium to strong. | 3.44 | Medium to strong. |
| 3.37 | Do. | | |
| 3.31 | Medium | | |
| 3.23 | Medium to strong. | | |
| 3.16 | Medium. | 3.16 | Do. |

The X-ray diffraction pattern of the new modification of quinacridone is characterized by two strong reflections at 14.3 and 6.37 A.; three medium to strong reflections at 3.44, 3.37 and 3.23 A.; three medium strong reflections at 3.54, 3.31 and 3.16 A.; and four weak reflections at 7.14, 6.15, 5.54 and 3.72 A.

Example 2

139.2 parts of 2:5-dianilinoterephthalic acid were stirred in 500 parts by volume of nitrobenzene and 80.5 parts by volume of pyridine. On slowly adding 100 parts by volume of benzoyl chloride the temperature rose slightly and a clear, deep yellow formed which was heated for 16 hours at 190 to 200° C. After cooling to 120° C. the thin, brown suspension was suction-filtered, thoroughly washed with nitrobenzene (heated to about 100° C.), and the remaining filter cake was then steam distilled in an aqueous alkaline suspension to free it from nitrobenzene. The residue was suction-filtered, washed with hot water and dried under vacuum at 100° C. Yield: 88 to 90% of the theoretical of pure quinacridone entirely in the β-modification.

Both the yield and the extreme ease of suctioning the product were the same when 80.5 parts by volume of pyridine were replaced by an equimolecular amount of the mixture of the isomeric β- and γ-picoline, or by either β-picoline or γ-picoline. The quality of the β-quinacridone obtained was likewise unaffected.

No technical advantage was gained by increasing the amount of pyridine used in this example which was about 2.5 mols of pyridine per mol of dianilinoterephthalic acid.

What is claimed is:

1. A process for the manufacture of linear quinacridone pigments which comprises heating a 2,5-diphenylaminoterephthalic acid which must be unsubstituted in a position ortho to the amino group of each phenylamine radical with an arylcarboxylic acid halide in the presence of a high boiling inert diluent and at least 0.3 mol of a pyridine base for each mol of diphenylaminoterephthalic acid used.

2. A process for the manufacture of the linear quinacridone in the β-modification according to claim 1, wherein for every mol of diphenylaminoterephthalic acid at least 2 mols of pyridine base are used.

3. A process as claimed in claim 1, wherein pyridine is used as pyridine base.

4. A process as claimed in claim 1, wherein nitrobenzene is used as high-boiling inert diluent.

References Cited by the Examiner

UNITED STATES PATENTS

| 3,085,023 | 4/1963 | Ehrich | 260—279 |

FOREIGN PATENTS

| 1,290,694 | 3/1962 | France. |
| 1,127,019 | 4/1962 | Germany. |
| 940,780 | 11/1963 | Great Britain. |
| 3,065,092 | 11/1962 | Switzerland. |

HENRY R. JILES, *Acting Primary Examiner.*

NICHOLAS S. RIZZO, *Examiner.*

D. M. KERR, D. G. DAUS, *Assistant Examiners.*